United States Patent
Hsu

(10) Patent No.: US 11,744,753 B2
(45) Date of Patent: Sep. 5, 2023

(54) TRANSMISSION DEVICE OF HOSPITAL BED

(71) Applicant: Pei-Yu Hsu, New Taipei (TW)

(72) Inventor: Pei-Yu Hsu, New Taipei (TW)

(73) Assignee: NANTONG SHUNLONG PHYSICAL THERAPY EQUIPMENT CO., LTD., Rugao (CN)

( * ) Notice: Subject to any disclaimer, the term of this patent is extended or adjusted under 35 U.S.C. 154(b) by 0 days.

(21) Appl. No.: 17/903,170

(22) Filed: Sep. 6, 2022

(65) Prior Publication Data
US 2022/0409459 A1 Dec. 29, 2022

Related U.S. Application Data

(62) Division of application No. 17/128,188, filed on Dec. 20, 2020, now Pat. No. 11,638,667.

(51) Int. Cl.
| | | |
|---|---|---|
| *A61G 7/018* | (2006.01) | |
| *A61G 7/012* | (2006.01) | |
| *A47C 19/04* | (2006.01) | |
| *H02K 7/06* | (2006.01) | |
| *A47C 20/04* | (2006.01) | |

(52) U.S. Cl.
CPC .............. *A61G 7/018* (2013.01); *A47C 19/04* (2013.01); *A47C 19/045* (2013.01); *A61G 7/012* (2013.01); *A47C 20/04* (2013.01); *A47C 20/041* (2013.01); *H02K 7/06* (2013.01)

(58) Field of Classification Search
CPC ........ A61G 7/018; A61G 7/012; A61G 7/002; A61G 7/015; A61G 7/0573; A61G 13/06; A47C 19/04; A47C 19/045; A47C 20/16; A47C 20/18; A47C 20/041; A47C 20/04; A47D 7/00
See application file for complete search history.

(56) References Cited

U.S. PATENT DOCUMENTS

| | | | |
|---|---|---|---|
| 8,533,878 B2 | 9/2013 | Wu | |
| 2013/0074266 A1* | 3/2013 | Wu | A61G 7/08 5/616 |
| 2016/0017966 A1* | 1/2016 | Wu | F16H 25/20 74/89.38 |

FOREIGN PATENT DOCUMENTS

| | | | |
|---|---|---|---|
| DE | 102004002662 A1 * | 8/2004 | A47C 20/041 |
| WO | WO-2017084669 A1 * | 5/2017 | |

* cited by examiner

*Primary Examiner* — David R Hare
*Assistant Examiner* — Deborah Talitha Gedeon
(74) *Attorney, Agent, or Firm* — Karin L. Williams; Alan D. Kamrath; Mayer & Williams PC

(57) ABSTRACT

A transmission device of a hospital bed contains: a main motor, a connection rod unit, a gear unit, and a driver. The gear unit includes a first coupling post, a second coupling post, a first gear, a second gear, a third gear, a third coupling post, and a fourth gear. The driver includes a first case, a second case, a first driving motor, a second driving motor, and a power cable. The first case has a first chamber, a third chamber configured to accommodate the first driving motor, and a fourth chamber configured to accommodate the second driving motor. The second case has a second chamber. The first coupling post, the second coupling post, the first gear, the second gear and the third gear are accommodated in the first chamber. The third coupling post and the fourth gear are accommodated in the second chamber.

5 Claims, 11 Drawing Sheets

TRANSMISSION DEVICE OF HOSPITAL BED

CROSS REFERENCE TO RELATED APPLICATIONS

The present application is a divisional application of co-pending application Ser. No. 17/128,188 filed on 20 Dec. 2020, and the entire disclosure of application Ser. No. 17/128,188 is incorporated herein.

FIELD OF THE INVENTION

The present invention relates to a hospital bed, and more particularly to a transmission device of the hospital bed which contains the first case and the second case configured to cover the driver and the gear unit easily so as to simplify connection and be portable easily.

BACKGROUND OF THE INVENTION

A hospital bed typically includes an apparatus for lifting and lowering a head board and a foot board.

A first conventional hospital bed includes a head board, a foot board, a dual-gear unit provided below the head board, and another dual-gear unit provided below the foot board. Thus, the head board and the foot board can be lifted and lowered because of the dual-gear units.

A second conventional hospital bed includes a frame, a dual-gear unit, a head board and a foot board. Both of the head board and the foot board are connected to the dual-gear unit. Thus, the head board and the foot board are lifted and lowered together with each other.

In the first and second conventional hospital beds, the head board and the foot board can be lifted and lowered. The dual-gear units are used together with shafts, cranks and other parts so that the cranks can be manually operated to lift and lower the head board and the foot board. Each of the first and second conventional hospital beds can be modified by connecting a motor unit to the dual-gear units or unit to lift and lower the head board and the foot board automatically. It however takes a considerably long period of time to dismantle each of the first and second conventional hospital beds in order to connect the motor unit to the dual-gear units or unit. The modification is difficult. The transportation of such a large amount of parts is inconvenient. Electric and/or electronic units could be damaged during the transportation.

Therefore, a conventional transmission device of a hospital bed is disclosed in U.S. Pat. No. 8,533,878 and contains a driver assembly, a gear assembly, a driving motor assembly configured to drive a head and a bed end to lift or descend.

However, the gear assembly has two gear sets received in two receiving boxes, and the driving motor assembly has a motor set accommodated in an accommodation box. In assembly, the two gear sets are received in the two receiving boxes, and two caps are locked on the two receiving boxes. Then, the motor set is accommodated in the accommodation box and is aligned with the two gear sets, and multiple screw bolts are configured to lock the accommodation box with the two receiving boxes, thus causing troublesome assembly and high connection cost.

The present invention has arisen to mitigate and/or obviate the afore-described disadvantages.

SUMMARY OF THE INVENTION

The primary objective of the present invention is to provide a transmission device of a hospital bed which contains the first case and the second case configured to cover the driver and a gear unit easily so as to reduce related elements, cost, simplifying connection, and enhancing aesthetic appearance.

To obtain the above objective, a transmission device of a hospital bed provided by the present invention, the hospital bed includes a body, a head, and a bed end.

The transmission device contains: a main motor, a connection rod unit, a gear unit, and a driver.

The main motor disposed on a bottom of the body and including a socket formed on an external face of the main motor.

The connection rod unit including a first fixing rod connected to the head and a second fixing rod connected to the bed end.

The gear unit gear unit including a first coupling post, a second coupling post parallel to the first coupling post, a first gear axially connected on the first coupling post, a second gear axially connected on the second coupling post and meshing with the first gear, a third gear axially connected on the first coupling post, a third coupling post, and a fourth gear axially connected on the third coupling post.

The first gear or the second gear is connected with the first fixing rod, and the fourth gear is connected with the second fixing rod.

The driver includes a first case, a second case, a first driving motor, a second driving motor, and a power cable.

The first case is hollow and has a first chamber, and the second case is hollow and has a second chamber, wherein the first coupling post, the second coupling post, the first gear, the second gear and the third gear are accommodated in the first chamber, and the third coupling post and the fourth gear are accommodated in the second chamber.

The first case has a first coupling orifice, and the second case has a second coupling orifice. Two ends of the drive shaft extend to the first coupling orifice of the first case and the second coupling orifice of the second case and to connect with the first fixing rod and the second fixing rod, thus connecting with the head and the bed end.

The first case further has a third chamber configured to accommodate the first driving motor, and the first case has a fourth chamber configured to accommodate the second driving motor, such that the power cable is electrically connected with the first driving motor, the second driving motor, and the main motor so that the first driving motor and the second driving motor drive the gear unit, and the gear unit actuates the head and the bed end to lift and descend.

DETAILED DESCRIPTION OF THE PREFERRED EMBODIMENTS

Figure 3:
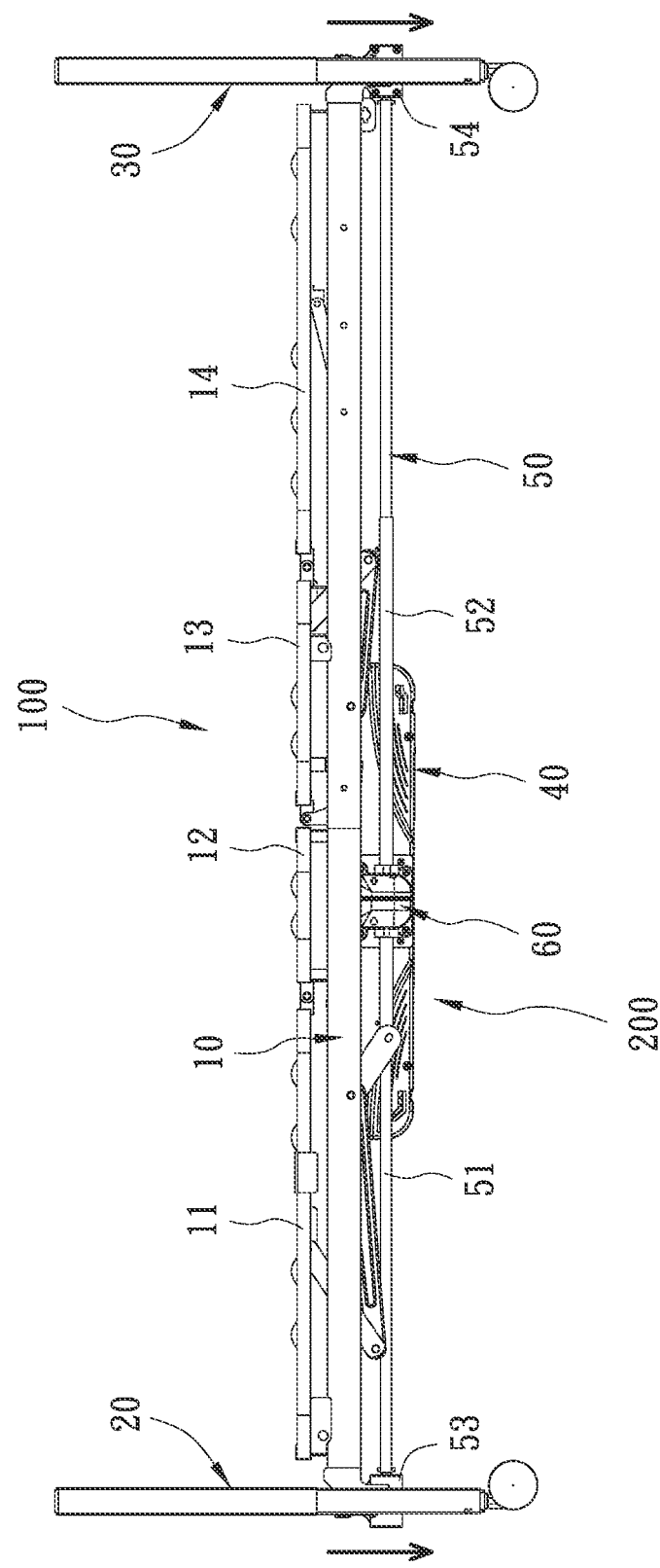
FIG. 3 is a side plan view showing the application of the transmission device of the hospital bed according to the first embodiment of the present invention.

With reference to FIG. 3, a transmission device of a hospital bed 100 according to a first embodiment of the present invention, the hospital bed 100 includes a body 10, a head 20, and a bed end 30.

The transmission device 200 comprises: a main motor 40, a connection rod unit 50, and a driver 60.

Figure 1:
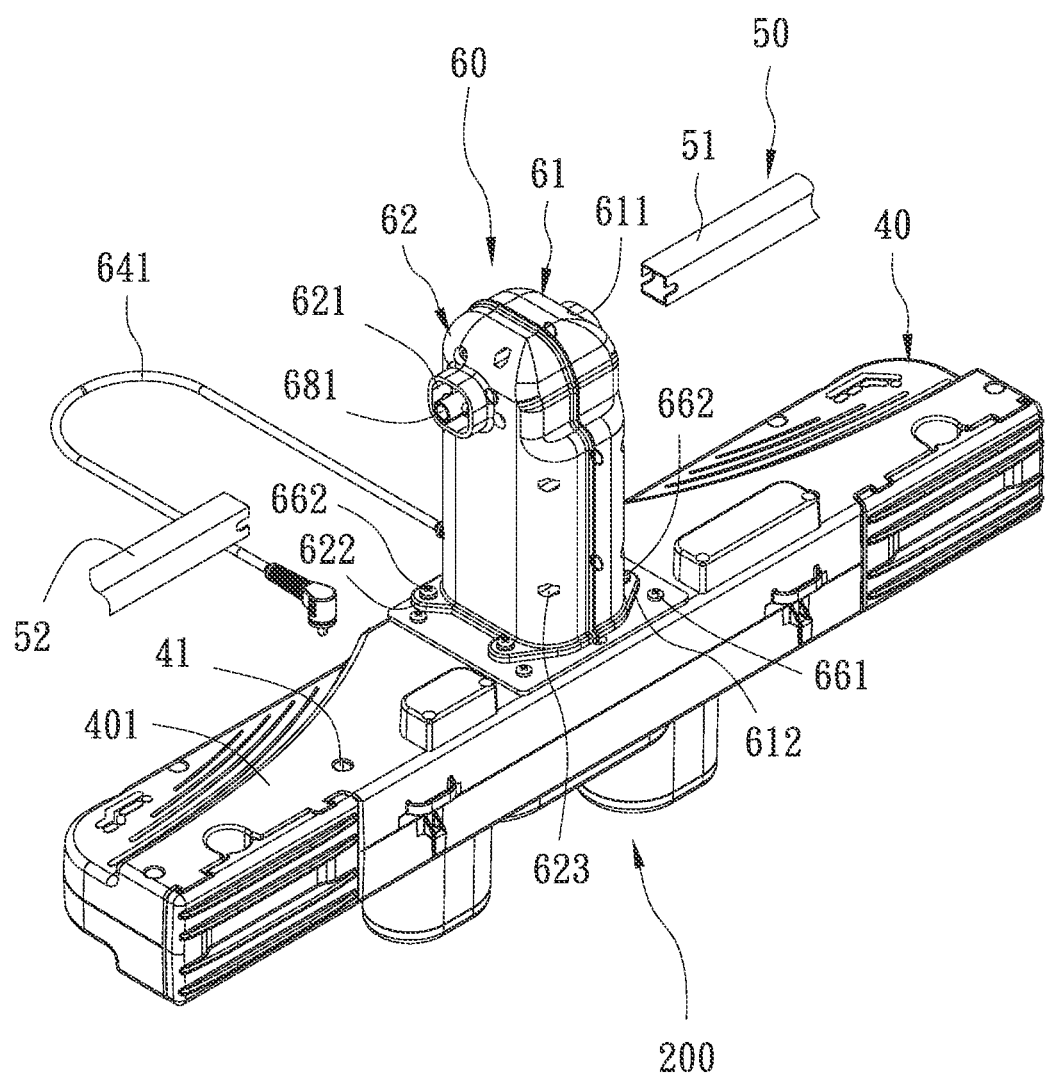
FIG. 1 is a perspective view showing the assembly of a transmission device of a hospital bed according to a first embodiment of the present invention.
Figure 2:
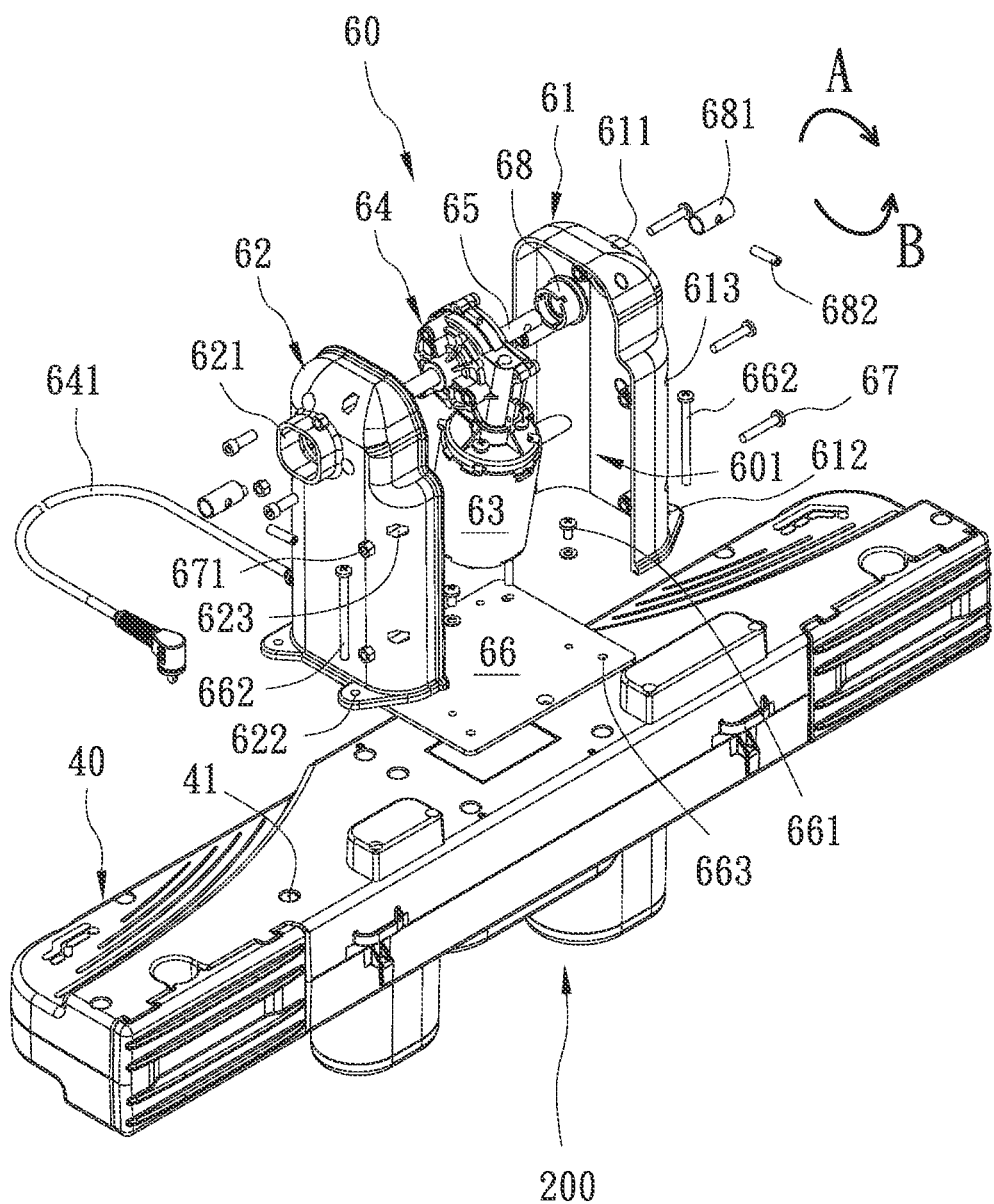
FIG. 2 is a perspective view showing the exploded components of the transmission device of the hospital bed according to the first embodiment of the present invention.

Referring to FIGS. 1 and 2, the main motor 40 is disposed on a bottom of the body 10 and is operated by externally connecting with a control interface (such as a remote control) so as to actuate a frame of the hospital bed and to push multiple support plates 11, 12, 13, 14 of the body 10 to tilt at different angles, thus changing a lying angle of the multiple support plates 11, 12, 13, 14 with respective to the body 10. The main motor 40 includes a socket 41 formed on an external face 401 thereof.

The connection rod unit 50 includes a first fixing rod 51 connected to the head 20, a second fixing rod 52 connected to the bed end 30, a first gear seat 53 arranged on a distal end of the first fixing rod 51 and configured to connect with the head 20, a second gear seat 54 arranged on a distal end of the second fixing rod 52 and configured to connect with the bed end 30, such that the head 20 and the bed end 30 are driven to lift or descend, as shown in FIG. 3.

The driver 60 is mounted on a side of the main motor 40, and the driver 60 includes an accommodation space 601 defined between the first case 61 and a second case 62, a driving motor 63 and a reducer 64 which are received in the accommodation space 601, a power cable 641 connected with the driver 60, a drive shaft 65 driven by the driving motor 63. The first case 61 has a first coupling orifice 611, and the second case 62 has a second coupling orifice 621, wherein two ends of the drive shaft 65 extend to the first coupling orifice 611 of the first case 61 and the second coupling orifice 621 of the second case 62 and to connect with the first fixing rod 51 and the second fixing rod 52, thus connecting with the head 20 and the bed end 30. The power cable 641 is connected between the socket 41 and the driving motor 63 so as to supply a power to the driving motor 63 and to lift or descend the head 20 and the bed end 30 synchronously.

The driver 60 further includes a holder 66 and multiple locking elements 661, 662, wherein the holder 66 is locked on the main motor 40 by using the multiple locking elements 661, 662, the holder 66 has multiple lock orifices 663, the first case 61 of the driver 60 has multiple first tabs 612, and the second case 62 of the driver 60 has multiple second tabs 622, such that the multiple locking elements 662 are inserted through the multiple first tabs 612 and the multiple second tabs 622 so as to fix the first case 61 and the second case 62 on the multiple lock orifices 663 of the holder 66. Since the driving motor 63 is locked on the holder 66 by ways of the first case 61 and the second case 62, the driver 60 is connected and removed by locking or unlocking the holder 66 quickly.

The driver 60 further includes multiple screw bolts 67 and nuts 671, wherein the first case 61 has multiple passing orifices 613 configured to receive the multiple screw bolts 67, and the second case 62 has multiple fixing orifices 623 corresponding to the multiple passing orifice 613 and configured to receive the multiple nuts 671, such that the first case 61 and the second case 62 are connected by using the multiple screw bolts 67 and the multiple nuts 671.

Furthermore, the driver 60 further includes multiple seal rings 68, multiple sleeves 681, and multiple connection bolts 682, wherein the multiple seal rings 68 are received in the first coupling orifice 611 of the first case 61 and the second coupling orifice 621 of the second case 62, the multiple sleeves 681 are connected on the two ends of the drive shaft 65 by way of the multiple connection bolts 682 and extending out of the first coupling orifice 611 and the second coupling orifice 621.

Figure 4:
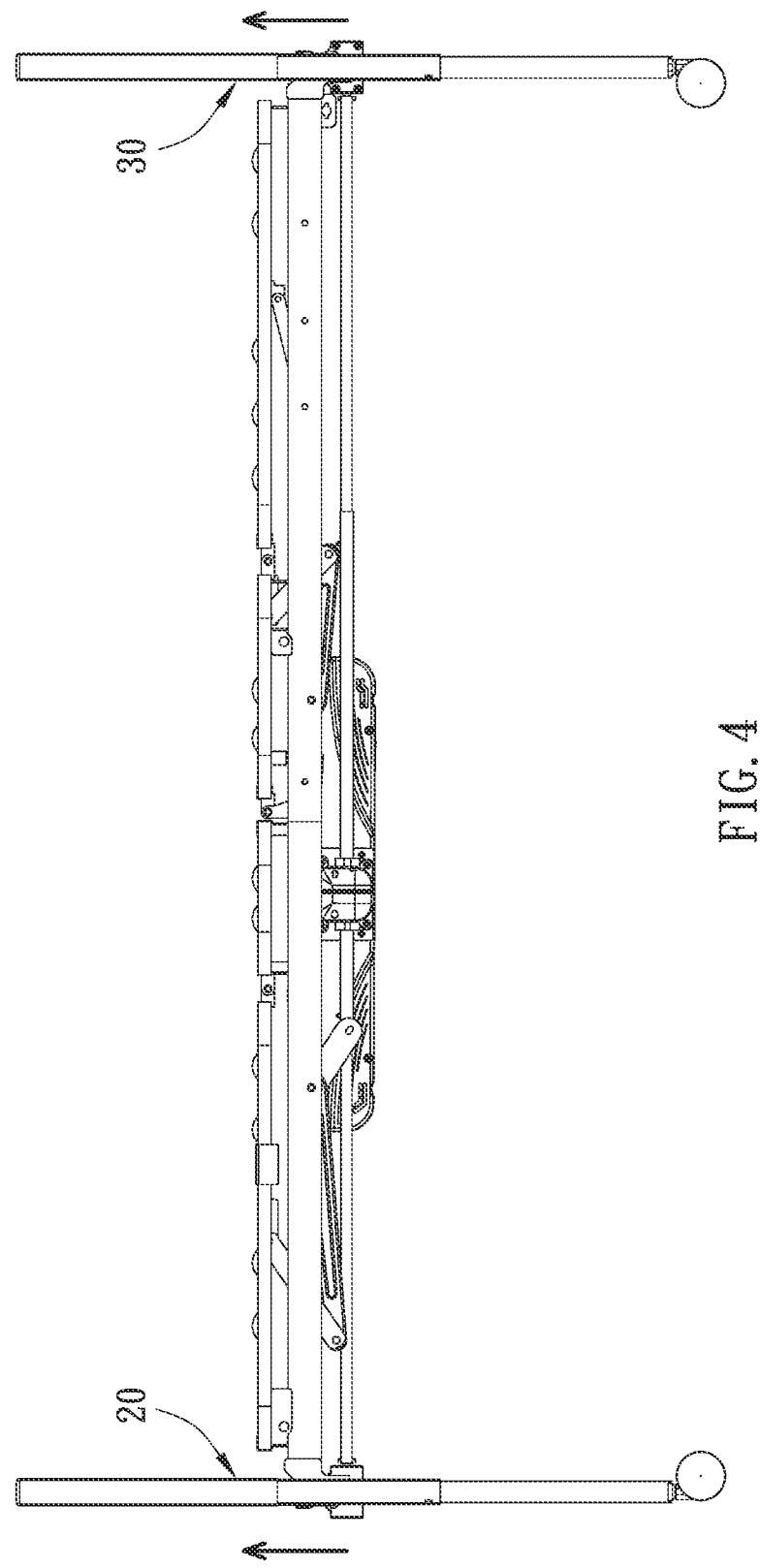
FIG. 4 is a side plan view showing the operation of the transmission device of the hospital bed according to the first embodiment of the present invention.

As shown in FIGS. 2 and 3, in operation of the transmission device 200, when the first fixing rod 51 and the second fixing rod 52 are connected with the drive shaft 65, the driving motor 63 drives the reducer 64 to actuate the drive shaft 65, and the first fixing rod 51 and the second rod 52 are driven by the drive shaft 65. When the drive shaft 65 rotates in a clockwise direction along an arrow A, the head 20 and the bed end 30 are driven to descend synchronously. As illustrated in FIGS. 2 and 4, when the drive shaft 65 rotates counterclockwise along an arrow B, the head 20 and the bed end 30 lift synchronously.

Accordingly, the main motor 40 and the driver 60 are connected to lift or descend the head 20 and the bed end 30, to be portable easily, and to avoid damage during transportation. Preferably, the first case 61 and the second case 62 are configured to cover the driver 60 easily, thus reducing related elements, cost, simplifying connection, and enhancing aesthetic appearance.

Figure 8:
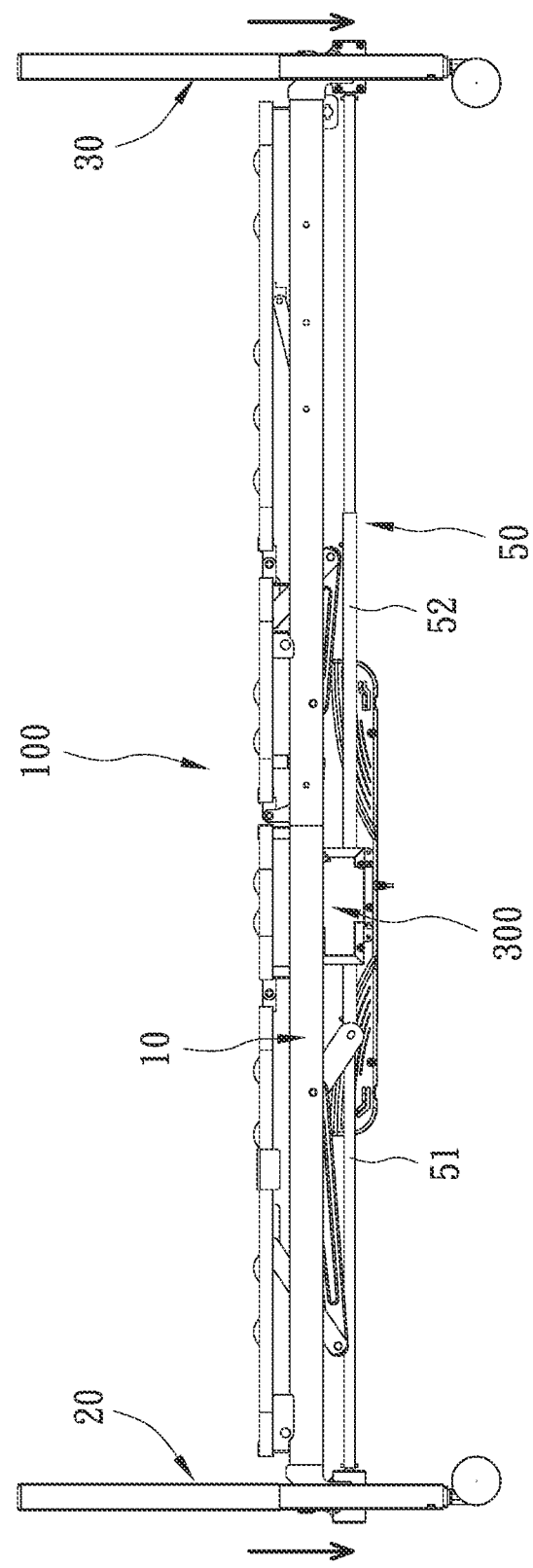
FIG. 8 is a side plan view showing the operation of the transmission device of the hospital bed according to the second embodiment of the present invention.

With reference to FIG. 8, a transmission device of a hospital bed 100 according to a second embodiment of the present invention, the hospital bed 100 includes a body 10, a head 20, and a bed end 30.

The transmission device 300 comprises: a connection rod unit 50 having a first fixing rod 51 and a second fixing rod 52, a main motor 70, a gear unit 80, and a driver 60.

Figure 5:
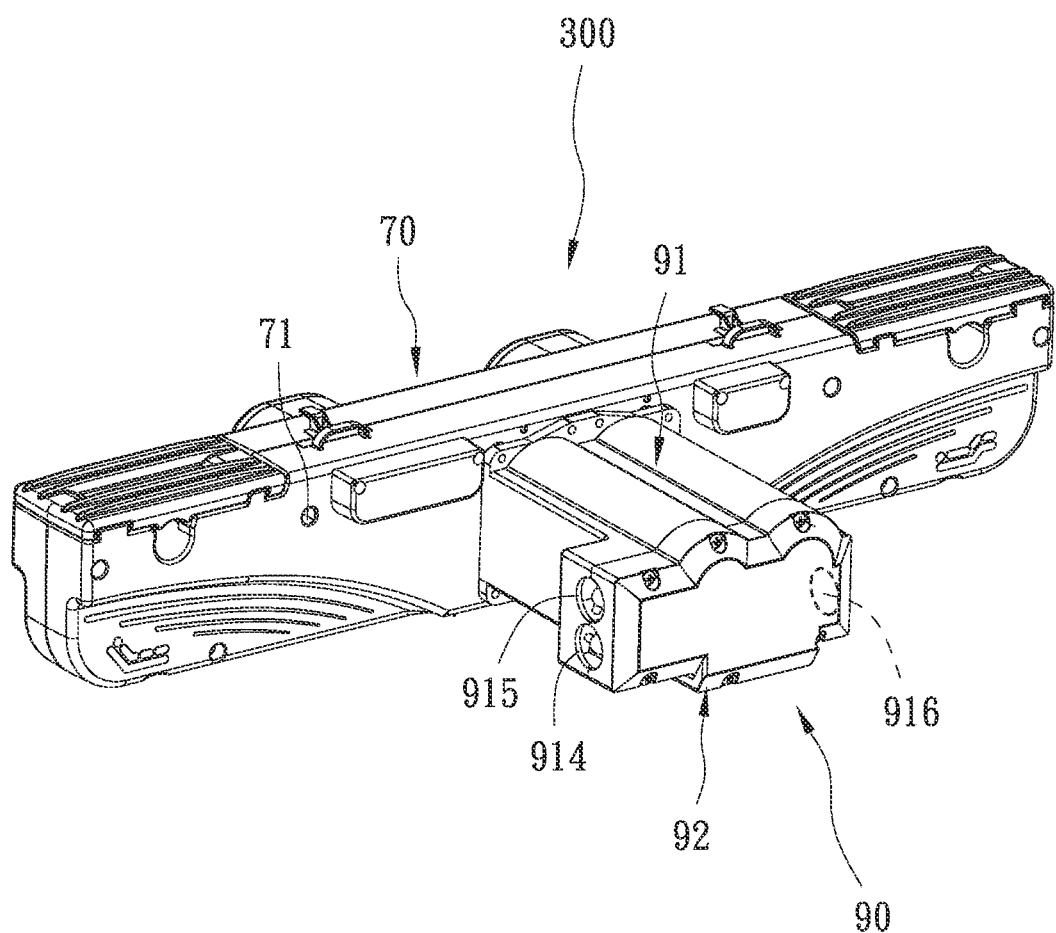
FIG. 5 is a perspective view showing the assembly of a transmission device of a hospital bed according to a second embodiment of the present invention.
Figure 6:
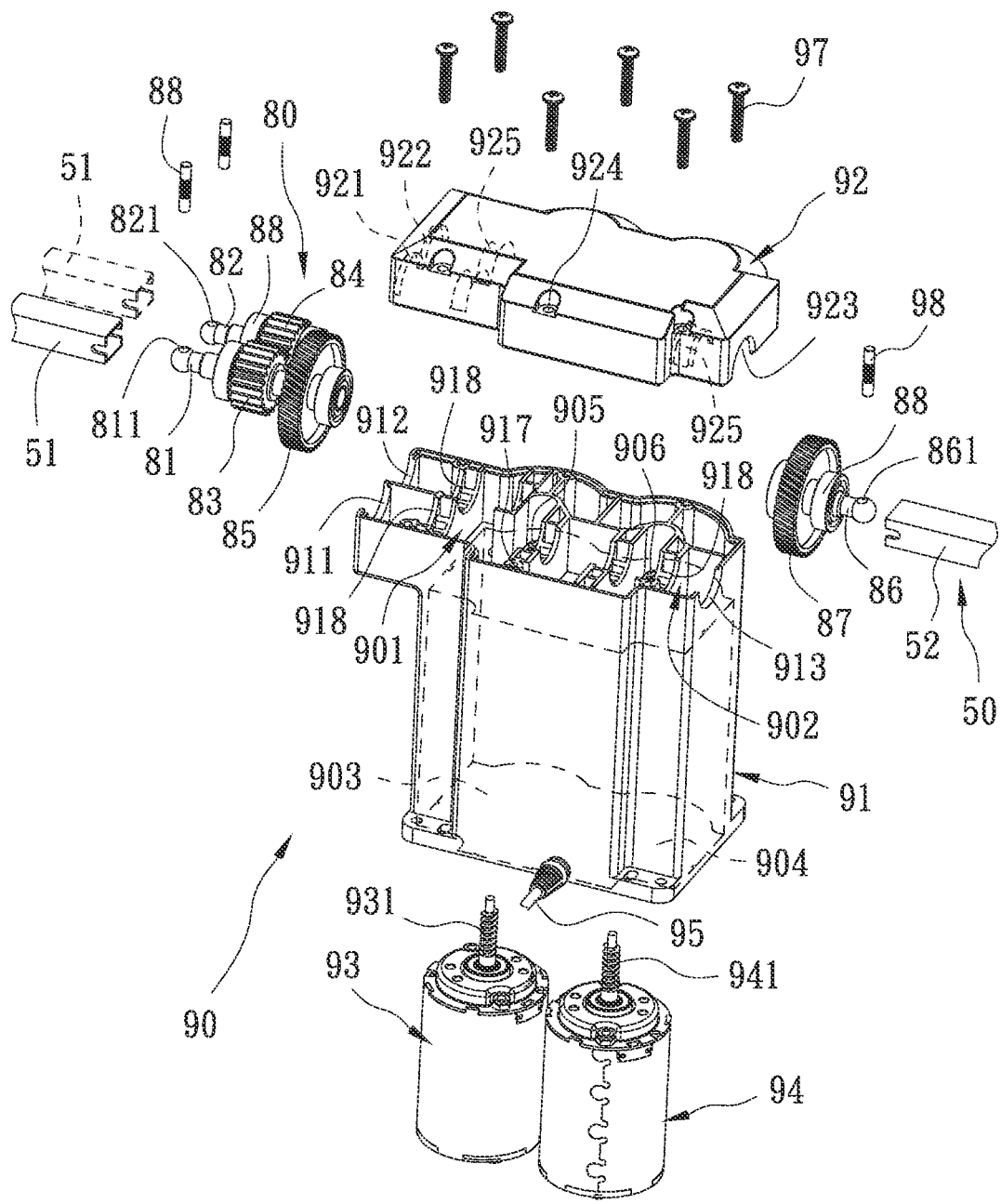
FIG. 6 is a perspective view showing the exploded components of the transmission device of the hospital bed according to the second embodiment of the present invention.

Referring to FIGS. 5 and 6, the main motor 70 is disposed on a bottom of the body 10 and is operated by externally connecting with a control interface (such as a remote control) so as to actuate a frame of the hospital bed and to push multiple support plates 11, 12, 13, 14 of the body 10 to tilt at different angles, thus changing a lying angle of the multiple support plates 11, 12, 13, 14 with respective to the body 10. The main motor 70 includes a socket 71 formed on an external face thereof.

The gear unit 80 includes a first coupling post 81, a second coupling post 82 parallel to the first coupling post 82, a first gear 83 axially connected on the first coupling post 81, a second gear 84 axially connected on the second coupling post 82 and meshing with the first gear 83, a third gear 85 axially connected on the first coupling post 81, a third coupling post 86, and a fourth gear 87 axially connected on the third coupling post 86. The gear unit 80 is fixed on a side of the main motor 70 and connected with the connection rod unit 50 so as to drive the head 20 and the bed end 30 to lift or descend.

The first gear 83 and the second gear 84 are a spur gear, and the third gear 85 and the second gear 87 are a worm gear.

The driver 90 includes a first case 91, a second case 92, a first driving motor 93, a second driving motor 94, and a power cable 95. The first case 91 is hollow and has a first chamber 901, and the second case 92 is hollow and has a second chamber 902, wherein the first coupling post 81, the second coupling post 82, the first gear 83, the second gear 84, and the third gear 85 are accommodated in the first chamber 901. The third coupling post 86 and the fourth gear 87 are accommodated in the second chamber 902. The first case 91 further has a third chamber 903 configured to accommodate the first driving motor 93, and the first case 91 has a fourth chamber 904 configured to accommodate the second driving motor 94, such that the power cable 95 is electrically connected with the first driving motor 93, the second driving motor 94, and the main motor 70 so that the first driving motor 93 and the second driving motor 94 drive the gear unit 80, and the gear unit 80 actuates the head 20 and the bed end 30 to lift and descend.

The first case 91 further has a first recess 911 and a second recess 912 which are defined beside the first chamber 901, and a third recess 913 defined beside the second chamber 902. The second case 92 has a first notch 921, a second notch 922, and a third notch 923 which are formed around a peripheral wall of the second case 92. When the first recess 911 of the first case 91 is connected with the first notch 921 of the second case 92, a first circular opening 914 is formed. When the second recess 912 of the first case 91 is connected with the second notch 922 of the second case 92, a second circular opening 912 is formed. When the third recess 913 of the first case 91 is connected with the third notch 923 of the second case 92, a third circular opening 916 is formed, wherein the first circular opening 914, the second circular opening 915, and the third circular opening 916 are configured to receive the first fixing rod 51 or the second fixing rod 52.

The first case 91 further has a first channel 905 extending from the third chamber 903 to the first chamber 901, and a second channel 906 extending from the fourth chamber 904 to the second chamber 902, such that a central stem 931 of the first driving motor 93 is inserted to the first chamber 901 from the first channel 905 so as to connect with the third gear 85. A central stem 941 of the second driving motor 94 is inserted into the second chamber 902 from the second channel 906 so as to connect with the fourth gear 87. The central stem 931 of the first driving motor 93 and the central stem 941 of the second driving motor 94 are a worm, and the third gear 85 and the fourth gear 86 are a worm gear.

The driver 90 further includes multiple locking elements 97 and multiple connection bolts 98, the first case 91 further has multiple lock orifices 917, and the second case 92 further has multiple passing orifices 924 corresponding to the multiple lock orifices 917, such that the multiple locking elements 97 are inserted through the multiple passing orifices 924 to lock with the multiple lock orifices 917 so that the second case 902 is connected with the first case 901.

The first coupling post 81 has a first receiving aperture 811, the second coupling post 82 has a second receiving aperture 821, and the third coupling post 86 has a third receiving aperture 861, wherein the multiple locking elements 97 are accommodated in the first receiving aperture 811, the second receiving aperture 821, and the third receiving aperture 861.

The gear unit 80 further includes multiple bearings 88 mounted on the first coupling post 81, the second coupling post 82, and the third coupling post 86. The first case 91 further has multiple first supporting portions 918 arranged on the first chamber 901 and the second chamber 902, and the second case 92 further has multiple second supporting portions 925, such that when the gear unit 80 is accommodated in the first case 91 and the second case 92, the multiple bearings 88 are engaged by the multiple first supporting portions 918 and the multiple second supporting portions 925 so as to fix and rotate the gear unit 80 smoothly.

Figure 7:
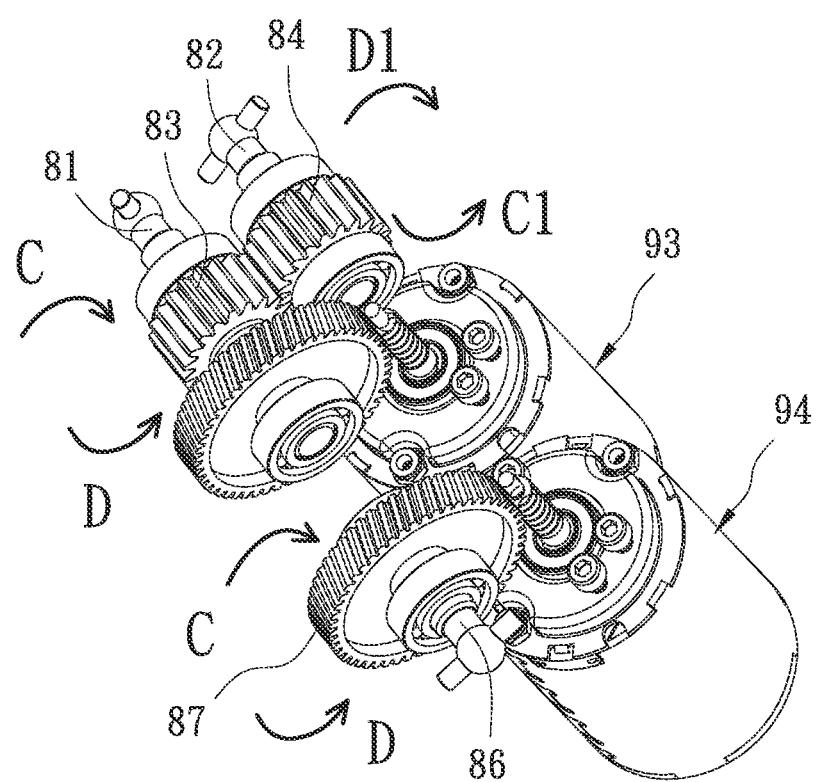
FIG. 7 is a perspective view showing the assembly of a part of the transmission device of the hospital bed according to the second embodiment of the present invention.
Figure 9:
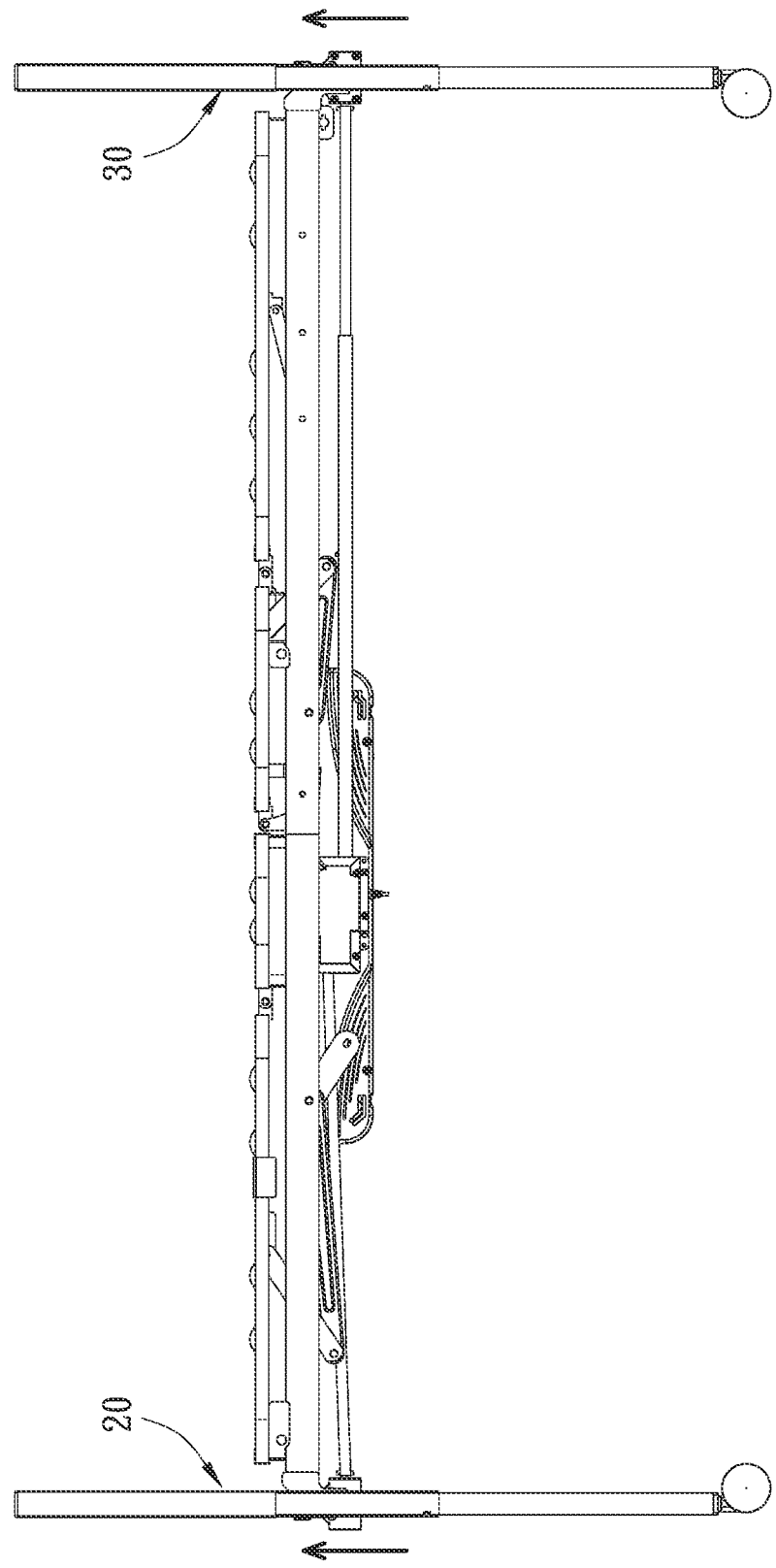
FIG. 9 is another side plan view showing the operation of the transmission device of the hospital bed according to the second embodiment of the present invention.

In operation of the transmission device 300, when the hospital bed is operated in an automatic mode, as shown in FIGS. 7 and 8, the first fixing rod 51 is connected on the first coupling post 81, the second fixing rod 52 is connected on the third coupling post 86, wherein a rotation direction of the first driving motor 93 is identical to a rotation direction of the second driving motor 94. When the first gear 83 rotates clockwise along an arrow C, the fourth gear 87 revolves clockwise along the arrow C, and the head 20 and the bed end 30 descend synchronously. Referring to FIGS. 7 and 9, when the first gear 83 rotates counterclockwise along an arrow D, the fourth gear 87 revolves counterclockwise along the arrow D, and the head 20 and the bed end 30 lift synchronously.

Figure 10:
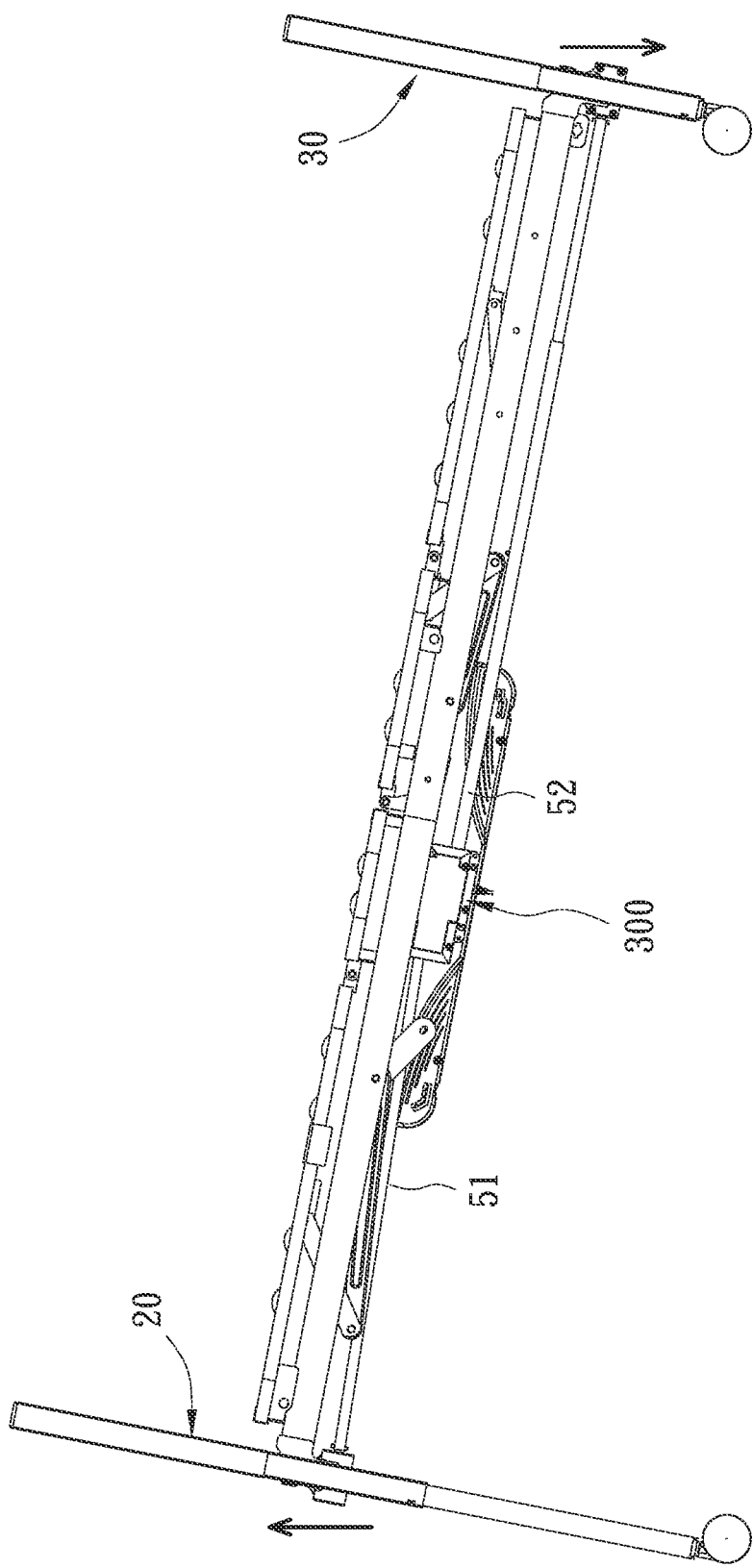
FIG. 10 is also another side plan view showing the operation of the transmission device of the hospital bed according to the second embodiment of the present invention.
Figure 11:
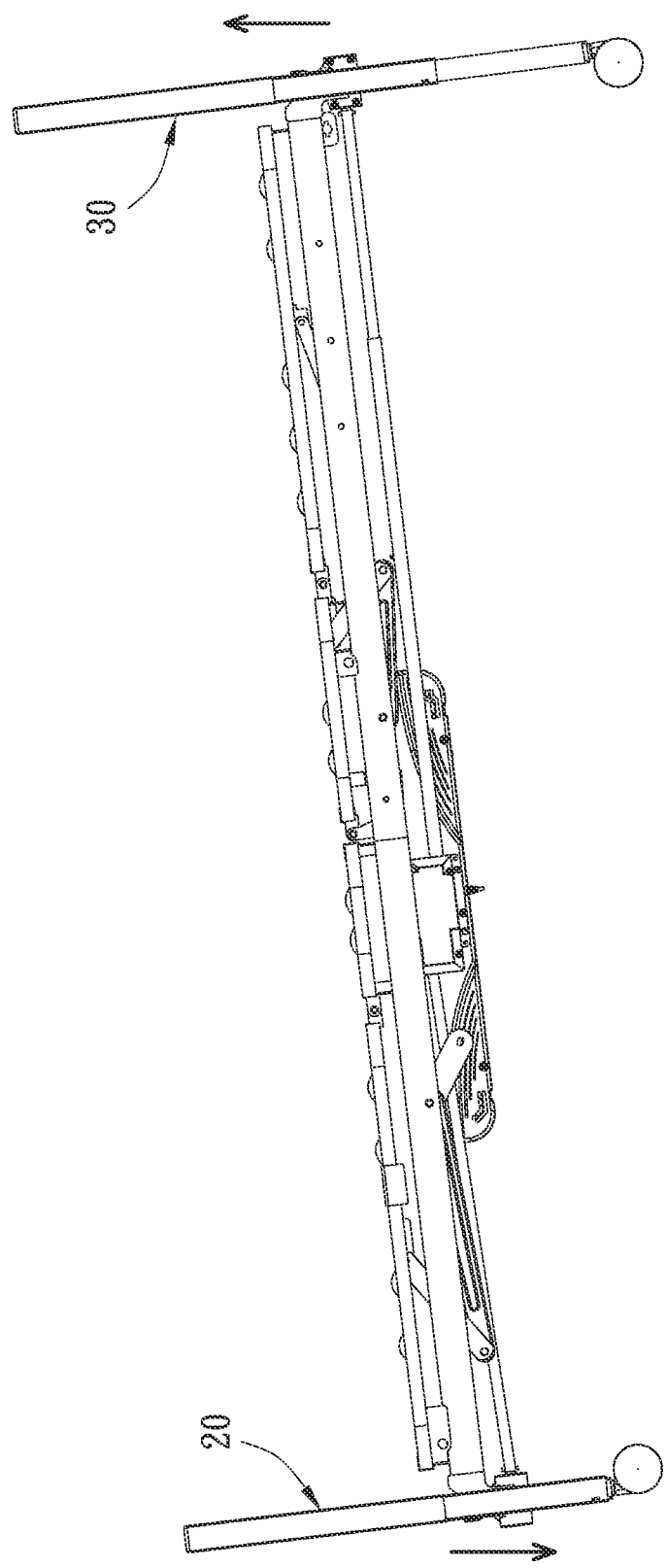
FIG. 11 is also another side plan view showing the operation of the transmission device of the hospital bed according to the second embodiment of the present invention.

With reference to FIGS. 7 and 10, when the first fixing rod 51 is connected on the second coupling post 82, the second fixing rod 52 is connected on the third coupling post 86, and the first driving motor 93 and the second driving motor 94 rotate in a same direction. When the first gear 83 rotates clockwise along the arrow C, the second gear 84 revolves counterclockwise along an arrow C1, and the fourth gear 87 revolves clockwise along the arrow C, such that the head 20 lifts, and the bed end 30 descends. As illustrated in FIGS. 7 and 11, when the first gear 83 rotates counterclockwise along the arrow D, the second gear 84 revolves clockwise along the arrow D1, and the fourth gear 87 revolves counterclockwise along the arrow D, such that the head 20 descends, and the bed end 30 lifts.

Thereby, the transmission device 300 of the second embodiment is configured to operate the hospital bed 100 in fourth modes, for example, in a first mode, the head 20 and the bed end 30 lift synchronously; in a second mode, the head 20 and the bed end 30 descend synchronously; in a third mode, the head 20 lifts, while the bed end 30 descends; in a fourth mode, the head descends, while the bed end 30 lifts. In addition, the first case 91 and the second case 92 accommodate the first driving motor 93 and the second driving motor 94 easily and beautifully.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A transmission device of a hospital bed, the hospital bed including a body, a head, and a bed end, the transmission device comprising: a main motor disposed on a bottom of the body and including a socket formed on an external face of the main motor; a connection rod unit including a first fixing rod connected to the head and a second fixing rod connected to the bed end; a gear unit including a first coupling post, a second coupling post parallel to the first coupling post, a first gear axially connected on the first coupling post, a second gear axially connected on the second coupling post and meshing with the first gear, a third gear axially connected on the first coupling post, a third coupling post, and a fourth gear axially connected on the third coupling post, wherein the first gear or the second gear is connected with the first fixing rod, and the fourth gear is connected with the second fixing rod; and a driver including a first case, a second case, a first driving motor, a second driving motor, and a power cable, wherein the first case is hollow and has a first chamber, and the second case is hollow and has a second chamber, wherein the first coupling post, the second coupling post, the first gear, the second gear and the third gear are accommodated in the first chamber, and the third coupling post and the fourth gear are accommodated in the second chamber, wherein the first case further has a third chamber configured to accommodate the first driving motor, and the first case has a fourth chamber configured to accommodate the second driving motor, such that the power cable is electrically connected with the first driving motor, the second driving motor, and the main motor so that the first driving motor and the second driving motor drive the gear unit, and the gear unit actuates the head and the bed end to lift and descend wherein the first driving motor and the second driving motor are defined between the main motor and the gear unit, wherein when the first case and the second case are connected, the first chamber and the third chamber of the first case are communicated, the first chamber of the first case is communicated with the second chamber of the second case, and the second chamber of the second case is communicated with the fourth chamber of the first case, and wherein when the first driving motor is accommodated in the third chamber and the second driving motor is accommodated in the fourth chamber, a central stem of the first driving motor and a central stem of the second driving motor face to and are perpendicular to the second case so as to increase a maintenance chamber among the gear unit, the first fixing rod, the second fixing rod, and the main motor.

2. The transmission device as claimed in claim 1, wherein the first case further has a first channel extending from the third chamber to the first chamber, and a second channel extending from the fourth chamber to the second chamber, such that the central stem of the first driving motor is inserted to the first chamber from the first channel so as to connect with the third gear, and the central stem of the second driving motor is inserted into the second chamber from the second channel so as to connect with the fourth gear.

3. The transmission device as claimed in claim 2, wherein the central stem of the first driving motor and the central stem of the second driving motor are a worm.

4. The transmission device as claimed in claim 1, wherein the first case further a first recess and a second recess which are defined beside the first chamber, and a third recess defined beside the second chamber; the second case has a first notch, a second notch, and a third notch which are formed around a peripheral wall of the second case; when the first recess of the first case is connected with the first notch of the second case, a first circular opening is formed; when the second recess of the first case is connected with the second notch of the second case, a second circular opening is formed; and when the third recess of the first case is connected with the third notch of the second case, a third circular opening is formed, wherein the first circular opening, the second circular opening, and the third circular opening are configured to receive the first fixing rod or the second fixing rod.

5. The transmission device as claimed in claim 1, wherein the first gear and the second gear are a spur gear, and the third gear and the fourth gear are a worm gear.

* * * * *